(No Model.)
W. EDENBORN.
REEL.
No. 543,801. Patented July 30, 1895.
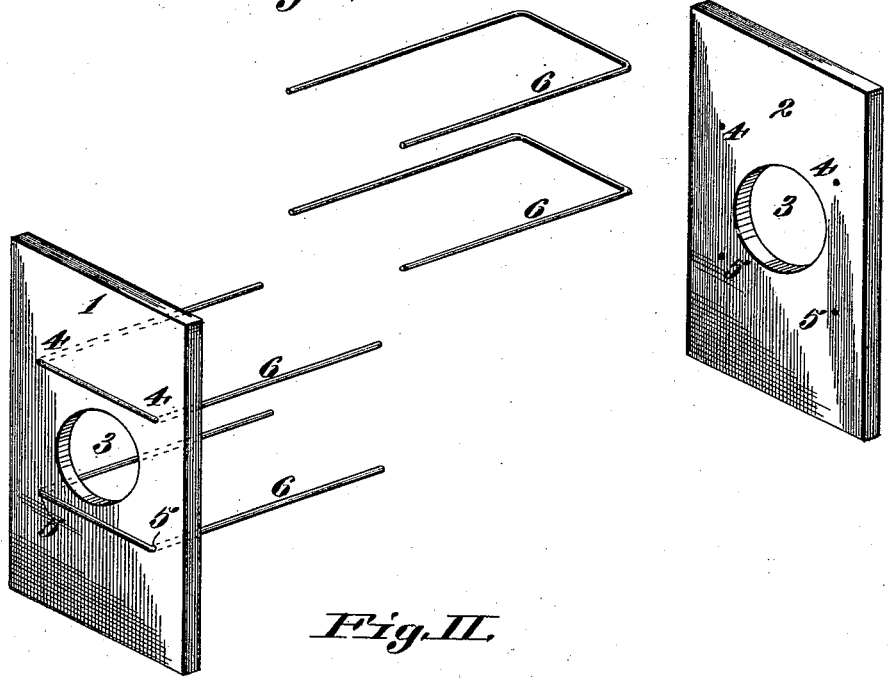
Fig. I.
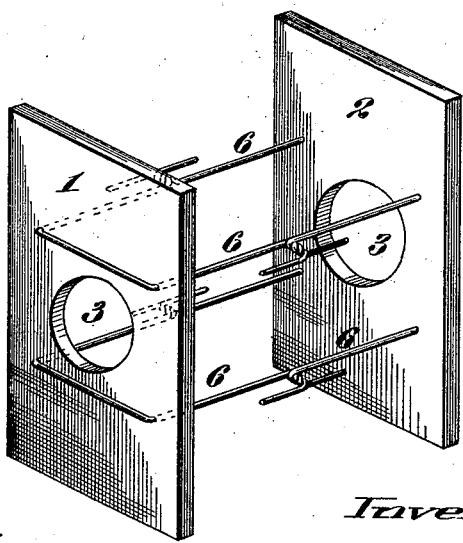
Fig. II.
Attest:
E. S. Knight
A. Finley
Inventor:
Wm. Edenborn
By Knight Bro.
att'ys

UNITED STATES PATENT OFFICE.

WILLIAM EDENBORN, OF ST. LOUIS, MISSOURI.

REEL.

SPECIFICATION forming part of Letters Patent No. 543,801, dated July 30, 1895.

Application filed September 24, 1894. Serial No. 523,918. (No model.)

*To all whom it may concern:*

Be it known that I, WILLIAM EDENBORN, of the city of St. Louis, in the State of Missouri, have invented a certain new and useful Improvement in Reels, of which the following is a full, clear, and exact description, reference being had to the accompanying drawings, forming part of this specification.

My invention relates to an improved reel intended more particularly for use in holding barb and other fence wires, but which may be used for other purposes—as, for instance, for holding ropes.

The object of my invention is to make a reel which will be cheaper and lighter than the ordinary reel.

My invention consists in features of novelty hereinafter fully described, and pointed out in the claim.

Figure I is a perspective view of my improved reel, showing it in a disjointed or disconnected condition. Fig. II is a perspective view showing the reel in its completed condition.

Referring to the drawings, 1 represents one head of the reel, and 2 the other head. These are preferably made of wood and are preferably made longer than they are wide. In each head is an opening 3 for receiving the sleeve or spindle upon which the reel is placed to have the wire wound upon it. Each head is provided with a pair of perforations 4 to one side of the center and a pair of perforations 5 to the other side of the center.

6 represents U-shaped wires that are passed through the perforations 4 and 5. There are four of these wires—one for each pair of perforations in each of the heads—and the legs of each U-shaped wire are spaced to fit easily in the pairs of wire-receiving perforations.

In making the reel the heads are prepared and the wires are then inserted in the perforations, as illustrated on the left-hand side of Fig. I, and the two heads with the wires are then placed on their spindle or sleeve, which is not shown in the drawings, but which is shown in my copending application, Serial No. 523,917, filed September 24, 1894, for method of manufacturing reels. This spindle or sleeve is provided with suitable means for holding the heads a fixed distance apart. I prefer to provide the central openings in the heads of different diameters, so that when the heads are placed on the spindles they will be held apart. The ends of the wires are then twisted together, as shown in Fig. II, and the reel is ready to receive the wire which is to be wound upon it. After the wire is wound upon the reel it is removed from its spindle or sleeve, the wires 6 holding the heads from moving apart, while the wire wound thereon holds the heads from moving toward each other.

In the ordinary way of making a reel considerable timber or other material is used to connect the heads, the wire being wound upon this timber. Such a reel is considerably more expensive than the one I have invented, but a more serious objection to it is its weight, especially where the wire has to be shipped a long distance.

With my improved reels the heads do not cost more than the heads of an ordinary reel, while the wires for connecting the heads cost but a mere trifle as compared with the timber used for this purpose in making the ordinary reel.

Still another advantage of my reel exists in the fact that it is cheaper to make in view of the fact that it requires much less time and labor than it does to make the ordinary reel.

Still another advantage, and a very meritorious one, arising from the use of my improved reel lies in the fact that the wires form a flexible core to the reel, which after the wire is wound upon the reel yields to the pressure arising from the fact that the wire is tightly wound upon the reel and is constantly exerting a pressure on the heads.

In the old form of reel where pieces of wood were used to unite the heads the core formed by these pieces of wood was practically inflexible, and it frequently happened that these cores would break under the strain exerted by the wire, while with my improved reel the wire uniting the heads forms a sufficiently flexible or yielding core to compensate for this tendency of the wrapped wire to force the heads apart and the difficulty heretofore experienced of the cores breaking is avoided.

I am aware that it is not broadly new to construct a reel of two heads connected by suitable wires which are twisted together to unite the heads; but I am not aware that such a reel has been constructed of U-shaped wire with legs spaced to fit the pairs of wire-receiving perforations.

I claim as my invention—

In the construction of reels, the combination of two heads formed with the central journal openings and the pairs of wire receiving perforations arranged around the journal openings in each head, with the independent U-shaped wires having their legs spaced to fit the pairs of wire receiving perforations, and passed through the wire receiving perforations in the heads with the corresponding ends of the wires from the two heads extending inwardly toward each other and twisted together to unite them, substantially as set forth.

WM. EDENBORN.

In presence of—
E. S. KNIGHT,
M. FINLEY.